US008883243B2

(12) United States Patent
Boursier

(10) Patent No.: US 8,883,243 B2
(45) Date of Patent: Nov. 11, 2014

(54) ENCAPSULATION AGENT COMPRISING A PEA MALTODEXTRIN AND/OR A PEA GLUCOSE SYRUP, COMPOSITIONS CONTAINING IT AND ITS PREPARATION METHOD

(75) Inventor: Bernard Boursier, Violaines (FR)

(73) Assignee: Roquette Freres, Lestrem (FR)

( * ) Notice: Subject to any disclaimer, the term of this patent is extended or adjusted under 35 U.S.C. 154(b) by 395 days.

(21) Appl. No.: 12/669,660

(22) PCT Filed: Jul. 9, 2008

(86) PCT No.: PCT/FR2008/051284
§ 371 (c)(1),
(2), (4) Date: Jan. 19, 2010

(87) PCT Pub. No.: WO2009/024690
PCT Pub. Date: Feb. 26, 2009

(65) Prior Publication Data
US 2010/0196542 A1    Aug. 5, 2010

(30) Foreign Application Priority Data

Jul. 19, 2007    (FR) ...................................... 07 05232

(51) Int. Cl.
    *A23L 1/0522*    (2006.01)
    *A23L 1/00*      (2006.01)
    *A23L 1/09*      (2006.01)
    *A23L 1/22*      (2006.01)
    *C08L 3/02*      (2006.01)

(52) U.S. Cl.
    CPC ............ *A23L 1/0522* (2013.01); *A23L 1/0029* (2013.01); *A23L 1/095* (2013.01); *A23L 1/22016* (2013.01); *C08L 3/02* (2013.01)
    USPC ................. 426/650; 426/89; 426/96; 426/103

(58) Field of Classification Search
    CPC ..... C08L 3/02; A23L 1/0029; A23L 1/22016; A23V 2200/224; A23V 2250/5114; A23V 2250/5118; A23V 2200/22; A23V 2250/61
    USPC ............. 426/293, 658, 96, 650, 302, 103, 98, 426/651, 89, 439, 490
    See application file for complete search history.

(56) References Cited

U.S. PATENT DOCUMENTS

| 5,087,461 | A  | * | 2/1992  | Levine et al. ................... 426/96 |
| 5,795,397 | A  | * | 8/1998  | Shi et al. .......................... 127/29 |
| 6,187,351 | B1 |   | 2/2001  | Porzio et al. |
| 6,277,186 | B1 |   | 8/2001  | Shi et al. |
| 7,488,503 | B1 | * | 2/2009  | Porzio et al. .................. 426/293 |
| 2003/0185863 | A1 |   | 10/2003 | Bengs et al. |
| 2005/0158429 | A1 | * | 7/2005  | Serpelloni ..................... 426/102 |

FOREIGN PATENT DOCUMENTS

| EP | 0820702 A    | 1/1998 |
| EP | 0953578 A    | 3/1999 |
| EP | 1304044 A    | 4/2003 |
| FR | 2865111 A    | 7/2005 |
| WO | 2004064540 A | 5/2004 |

OTHER PUBLICATIONS

Berthod, Alain; Celia Garcia-Alvarez-Coque. Micellar Liquid Chromography. Marcel Dekker, Inc. 2000, pp. 211-212.*
Hoover R et al: "Composition, structure, functionality and chemical modification of legume starches: a review", Canadian Journal of Physiology and Pharmacology, 1991, pp. 79-92, vol. 69, XP008089410.
Reineccius GA: "The Spray Drying of Food Flavors", Drying Technology, Jun. 2004, pp. 1289-1324, vol. 22, No. 6, Taylor & Francis, Philadelphia, PA, US, XP801288326.
Inglett G E et al: Encapsulation of Orange Oil, ACS Symposium Series, 1988, pp. 29-36, vol. 370, XP800870453.
International Search Report in Corresponding Application PCT/FR2008/051284.
European Search Report in Corresponding Application FR0705232/FA696436 Dated Mar. 26, 2008.

* cited by examiner

*Primary Examiner* — Lien T. Tran
*Assistant Examiner* — Hong T Yoo
(74) *Attorney, Agent, or Firm* — Young & Thompson

(57) ABSTRACT

A subject of the present invention is the use of a maltodextrin and/or a glucose syrup obtained, by acid or enzymatic hydrolysis, from a leguminous starch having an amylose content comprised between 25% and 50%, expressed as dry weight relative to the dry weight of starch, for the encapsulation of organic compounds.

11 Claims, 1 Drawing Sheet

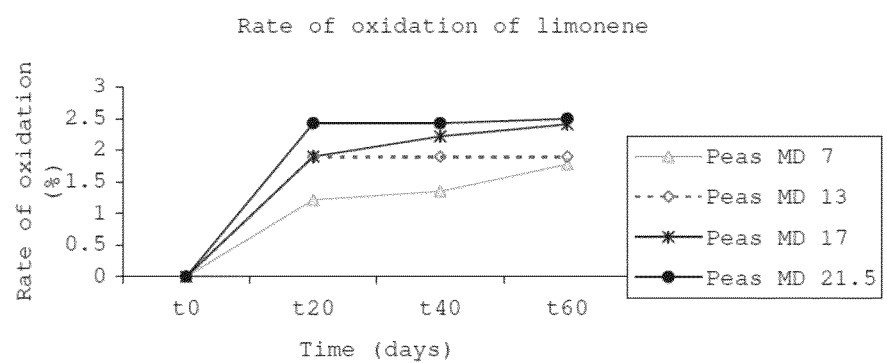

ENCAPSULATION AGENT COMPRISING A PEA MALTODEXTRIN AND/OR A PEA GLUCOSE SYRUP, COMPOSITIONS CONTAINING IT AND ITS PREPARATION METHOD

FIELD OF THE INVENTION

The present invention relates to the use of maltodextrins and/or of glucose syrups originating from leguminous starches for the encapsulation of organic compounds for the inclusion, stabilization and protection of labile and/or volatile organic compounds, and notably of hydrophobic substances, in particular aromatic substances.

BACKGROUND OF THE INVENTION

It is known to a person skilled in the art in the food industries that the volatile compounds present in products contribute to their savour. Flavourings are generally mixtures of aromatic substances mainly comprising volatile molecules. The volatility and/or the lability of certain molecules present in food products can be responsible for a variation in the flavours and taste of foods over time. Therefore, the food industries often choose to increase the concentration of these flavourings in order to compensate for their degradation or disappearance over time. As some of these compounds are expensive, the use of large quantities of flavourings presents however a problem regarding cost.

By "flavouring" or "aromatic substance" is meant a compound imparting an odour or taste to the composition to which it is added. There can be mentioned as examples the spice oleoresins, alliaceous flavours essential oils; botanical extracts; botanical flavouring extracts and protein hydrolysates.

The flavouring can be in the form of an oil, non-aqueous solution or emulsion.

The term "labile" describes unstable compounds the interaction of which with the environment leads to degradation, loss of function or destruction. Thus, certain molecules can have sensitivity to external agents such as heat, light, atmospheric oxygen or humidity. This sensitivity can be responsible for a degradation or conversion of the molecule to an undesirable compound from the stage of formulation or during the production or storage of the food products, thus making them unfit for consumption.

Therefore, these labile compounds must be packaged in an appropriate manner in order to guarantee both
  good preservation without alteration of their organoleptic properties and
  their availability for flavouring the food in which they are present.

Numerous encapsulation, micro-encapsulation or trapping methods have been developed in order to protect the volatile and/or labile molecules of flavouring during its production, during the process of manufacture of the food product or during the storage and use of the latter.

Similar problems are encountered in the pharmaceutical field where encapsulation is frequently used to solve problems of lability, solubilization of hydrophobic compounds, bioavailability or bitterness of certain active principles. Encapsulation also allows slow and controlled release of the active principles. Of course, the encapsulation agents must be biocompatible and bioresorbable.

The active principle to be encapsulated can be incorporated in the encapsulation agent as it is, i.e. in its solid or liquid native form. It can also be incorporated in the form of an emulsion or aqueous suspension. This aqueous emulsion can be obtained by emulsification of the pure active principle or of the active principle previously dissolved in an appropriate oil of the silicone oil type for example.

The most used encapsulation agents are generally of osidic nature: wheat, potato, maize starches and their derivatives (modified starches, dextrins, maltodextrins, glucose syrups, dextrose, polyols etc.), gum arabic which is the most used encapsulation support, saccharose, cyclodextrins, cellulose and its derivatives, alginate type gums, agar-agar or carragheenans.

In all the methods of protection by encapsulation, the encapsulation agent must have the following characteristics:
  not modify the characteristics of the encapsulated products,
  be odourless,
  have a low viscosity, even at a high concentration,
  stabilize the emulsion while drying,
  be non-toxic and edible,
  have a low hygroscopicity,
  have an ability to progressively release the encapsulated active material and
  have a low cost.

Various encapsulation techniques exist, chosen depending on the intended purpose of the product to be encapsulated or its use.

A first system, known as a matrix or coating system comprises the inclusion of a substance in a solid matrix by occlusion or adsorption. This encapsulation is carried out for example by spray drying or dispersion drying, during which the flavourings are emulsified in a suitable continuous phase, and then spray dried in a hot draught. The encapsulation agents most used for this technique include gum arabic, maize, wheat, tapioca or potato maltodextrins, dextrose, lactose and gelatin. Other technologies are also described such as cold spray-drying, granulation, extrusion or coating in a fluidized bed.

A second system known as membrane encapsulation consists of surrounding the compounds to be encapsulated with a continuous film of polymers, lipids, glucides or polysaccharides. The techniques used are for example coacervation, co-extrusion or the use of liposomes.

The extrusion technique is described in the U.S. Pat. No. 6,187,351 which describes the use of different polymers, which include maize, rice, wheat or tapioca starches and maltodextrins.

The document EP 1,304,044 describes the use of sugars, modified starches, maltodextrins and other polymers in combination with a cellulose derivative.

The maltodextrins and glucose syrups are conventionally obtained by acid and/or enzymatic hydrolysis of starch. They can be used as encapsulation agents and contain a complex mixture of linear and branched saccharides. Referring to the regulatory status, the maltodextrins have a dextrose equivalent (DE) of 1 to 20. The glucose syrups have a DE greater than 20.

The quality of an encapsulation can be evaluated for example by measuring the encapsulated compound protection by the encapsulation agent against oxidation.

It has thus been noted that, during the limonene encapsulation by maize maltodextrins or maize glucose syrups of varying DE, the oxidation of the flavouring over time decreased when the DE of the encapsulation agent increased (Reineccius G. A. (1988) "Spray drying of Food Flavors" In "Flavor Encapsulation," eds. Sara J. Risch and Gary A. Reineccius, chap. 7, pp: 55-66.). In other words, the protection of a flavouring by encapsulation is better with maize glucose syrups (with a significant DE) than with maize maltodextrins (with a low DE). Moreover, encapsulation is better with the most highly hydrolyzed maize maltodextrins.

Moreover, a study of the quality of encapsulation by maltodextrins of various vegetable origins has shown that, when the DEs of maize, rice, tapioca or potato starch derivatives (maltodextrins, glucose syrups) increase, the protection of the encapsulated compounds vis-à-vis oxidation increases, irrespective of the vegetable origin of the starch. Moreover, the maize, tapioca or rice maltodextrins with a high DE, or even the wheat, tapioca or rice glucose syrups are encapsulation agents allowing better protection against oxidation Onglett G. E., Gelbman P., and Gary A. Reineccius (1988) "Encapsulation of Orange Oil: Use of Oligosaccharides from α-Amylase Modified Starches of Maize, Rice, Cassava, and Potato." In "Flavor Encapsulation," eds. Sara J. Risch and Gary A. Reineccius, chap. 4, pp: 29-36). These observations have been adopted as a general principle.

The prior art also describes the use of cyclodextrins, dextrins or amylose as encapsulation agents.

These molecules form inclusion complexes with the molecules to be encapsulated which are trapped either between molecules of the encapsulating agent forming a crystalline organization, or in a cavity formed by a structure of the encapsulation molecule. The techniques mainly used with these encapsulation agents are kneading, crystallization and lyophilization.

In the food sector, these techniques advantageously allow to obtain water-soluble hydrophilic powders containing hydrophobic compounds or an increase in the thermal stability of the flavourings during cooking. Due to their reversible character they allow good complexation in concentrated medium and the release of the encapsulated molecules in diluted aqueous medium or after contact with saliva.

β-cyclodextrin is the most used of the cyclodextrins and the most economical to produce. However, the use of cyclodextrins is highly regulated.

In order to be free from these regulatory constraints, the development of the use of amylose as an encapsulation agent forming inclusion complexes has been envisaged. Amylose is organized in helices with a hydrophilic external surface due to the presence of hydroxyl groups and with a hydrophobic internal surface due to the presence of hydrogen atoms. This helical structure confers the amylose the necessary characteristics for the encapsulation of active principles or flavourings.

The use of pure amylose cannot however be envisaged on an industrial scale due to their great propensity to crystallization or retrogradation.

The use of starches rich in amylose (starches containing more than 50% amylose) for encapsulation, also involves various constraints, since they require very strict conditions of preparation and use. Indeed, these starches retrograde rapidly due to their richness in amylose. Moreover, they require very high cooking temperatures, of the order of 120° C. In order to prevent retrogradation phenomena, the encapsulation must be carried out at high temperatures of the order of 90 to 100° C. Now at these temperatures, the labile and/or volatile compounds are degraded or evaporate. In order to reduce their retrogradation temperature, starches containing more than 50% amylose are generally modified by fixation of chemical groups. These starches are named stabilized.

By "stabilization" of starch is meant all the operations known to a person skilled in the art intended to slow down or check the retrogradation of the starch. The stabilization is obtained by substitution of the hydroxyl functions of the starch, by esterification or etherification. It can also be obtained by oxidation. These stabilization treatments are in particular hydroxypropylation, acetylation, phosphation and oxidation.

The stabilization of amylose-rich starches allows to reduce their retrogradation temperature to 50-60° C. but reduces their ability to form inclusion complexes.

In the particular context of the encapsulation of flavourings of alcoholic liquids such as wine, the document EP 820 702 describes the use of a pea starch as an encapsulation agent by spray-drying or by lyophilization. Pea starch is described as imparting to the encapsulation qualities of retention of the flavourings without retention of alcohol. The presence of long polysaccharidic chains is the characteristic essential for the pea starch to be able to encapsulate the flavourings according to the described invention. In fact, this document EP 820 702 excludes the use of a hydrolyzed pea starch and quite particularly the use of pea maltodextrins and glucose syrups as encapsulation agents. According to this document, these hydrolyzed forms of starch comprise sugar chains which are too short to allow encapsulation.

The purpose of the present invention is to extend the range of encapsulation agents and encapsulation techniques which can be used with the same encapsulation agent. The encapsulation agent must be easy to use, non-toxic and allow a controlled release of the encapsulated compound.

The present invention is based on the discovery, contrary to the conclusions of EP 820 702, that certain leguminous starches hydrolysis products, and in particular pea, were excellent encapsulation agents of hydrophobic substances, in particular aromatic substances.

The Applicant, during tests aimed at proposing novel encapsulation agents, has surprisingly noted that the maltodextrins and glucose syrups derived from leguminous starches had an atypical behaviour, different from that of the equivalent products derived from maize, rice, wheat or tapioca starches, which were characterized by the fact that their power of protection of the encapsulated compounds vis-à-vis oxidation was as much better as their DE was lower.

The Applicant has moreover noted that the maltodextrins and/or glucose syrups derived from leguminous protected certain encapsulated compounds against oxidative degradation better than the corresponding products derived from other starches.

SUMMARY OF THE INVENTION

The present invention relates consequently to the use of maltodextrin and/or glucose syrup obtained, by acid or enzymatic hydrolysis, from a leguminous starch having an amylose content comprised between 25% and 50%, expressed as dry weight relative to the dry weight of starch, for the encapsulation of organic compounds, preferably hydrophobic organic compounds.

The leguminous starch preferably has an amylose content comprised between 30% and 40%, in particular comprised between 35% and 40%, and more preferentially between 35% and 38%, these percentages being expressed as dry weight relative to the dry weight of starch.

DETAILED DESCRIPTION OF THE INVENTION

By "leguminous" is meant within the meaning of the present invention any plant belonging to the families of the Caesalpiniaceae, Mimosaceae or Papilionaceae and notably any plant belonging to the family of the Papilionaceae such as, for example, pea, bean, broad bean, horse bean, lentil, lucerne, clover or lupin.

This definition includes in particular all the plants described in any one of the tables contained in the article by R. HOOVER et al., 1991 (HOOVER R. (1991) "Composition, structure, functionality and chemical modification of leguminous starches: a review" Can. J. Physiol. Pharmacol., 69, pp: 79-92).

The encapsulating power is conventionally determined by the study of the evolution of the encapsulated compound oxidation as a function of time and under controlled conditions (Reineccius G. A. (1988) "Spray drying of Food Flavors" In "Flavor Encapsulation," eds. Sara J. Risch and Gary A. Reineccius, chap. 7, pp: 55-66). This measurement allows to assess the quality of the barrier formed by the encapsulation agent around the encapsulated product.

As indicated previously, the increase in the encapsulating power and protective power (antioxidation) of the maltodextrins and glucose syrups used according to the invention, when their DE decreases, is not observed usually in the case of encapsulation with maltodextrins and/or glucose syrups of other vegetable origins. For maize, rice, tapioca or potato, the reverse phenomenon is observed (Reineccius G. A. (1988) "Spray drying of Food Flavors" In "Flavor Encapsulation," eds. Sara J. Risch and Gary A. Reineccius, chap. 7, pp: 55-66).

It can be mentioned by way of examples of encapsulation techniques of compounds with the maltodextrins and the glucose syrups used in the present invention, spray-drying, granulation, coating, kneading, extrusion, lyophilization, crystallization and any type of conventional encapsulation techniques.

The encapsulation agent containing the encapsulated product is intended for the pharmaceutical industry, the cosmetic industry, the food industry, the paper and non-wovens industry, textiles, super-odoriferous products and deodorants, detergents or phytosanitary products. Indeed, the encapsulation agent according to the invention allows encapsulation of various compounds with different physicochemical characteristics and sizes, such as notably vitamins, intense sweeteners, colouring agents, fats, lipophilic, hydrophilic active principles, hydrophilic or hydrophobic molecules or even proteins.

The dehydrated maltodextrins and glucose syrups used according to the invention have the advantage of being easy to obtain as, due to the low amylose content of the starch from which they originated, the retrogradation phenomena are observed at lower temperatures than for starches rich in amylose, i.e. containing more than 50% amylose.

The retrogradation of pea starches starts only at 60-70° C. since at the same concentration, amylose-rich starches retrograde as from 90-100° C. This low retrogradation temperature allows the use of an enzymatic hydrolysis which cannot be envisaged for certain maize starches in particular.

In fact, in order to prevent the retrogradation of these starches, a very high temperature, and in particular a temperature of the order of 100-110° C., is used, at which the enzymes conventionally used are denatured by the heat and therefore inactivated.

Thus, the maltodextrins and glucose syrups used according to the present invention are prepared by managed acid hydrolysis or enzymatic hydrolysis of leguminous starches. In order to prepare them, a person skilled in the art will refer to the known techniques of the state of the art.

In certain encapsulation methods of the present invention, the glucose syrups are used in dehydrated form. This dehydration is carried out according to techniques familiar to a person skilled in the art.

Preferably, the leguminous plant is chosen from the group formed by the pea, bean, broad bean, horse bean and their mixtures.

According to another advantageous variant, the leguminous plant is a variety of pea or horse bean, producing seeds containing at least 25%, preferably at least 40%, by weight of starch (dry/dry).

This high starch content confers the variety of pea or horse bean according to the invention, a major benefit concerning notably the obtaining yield of the encapsulation agent. As a result, the maltodextrins and/or glucose syrups according to the invention are both easy to manufacture and can be obtained with a high yield.

Advantageously, said leguminous plant is the pea. The term "pea" being here considered in its broadest sense and including in particular:
  all the wild "smooth pea" varieties and
  all the mutant "smooth pea" and "wrinkled pea" varieties, irrespective of the uses for which said varieties are generally intended (human consumption, animal nutrition and/or other uses).

Said mutant varieties are in particular those known as "r mutants", "rb mutants", "rug 3 mutants", "rug 4 mutants", "rug 5 mutants" and "lam mutants" as described in the article by C-L HEYDLEY et al. (HEYDLEY C-L (1996) "Developing novel pea starches" Proceedings of the Symposium of the Industrial Biochemistry and Biotechnology Group of the Biochemical Society, pp. 77-87).

The glucose syrups used in the present invention preferably have a dextrose equivalent of less than 30.

The maltodextrins from leguminous plants used in the present invention advantageously have a dextrose equivalent (DE) of less than 18 and preferably comprised between 3 and 7. It is in fact these products with low DE which have proved to be excellent encapsulation agents providing optimum protection of the encapsulated compounds against oxidation.

The compounds to be encapsulated according to the present invention are preferably chosen from flavourings, colouring agents, liposoluble vitamins, odoriferous molecules, intense sweeteners and fats.

There can be mentioned in particular the fatty acids, monoglycerides, decanal, octanal, hexanal, butanol, menthone, fenchone, limonene, naphthol, spice oleoresins, essential oils of the alliaceous flavours, benzoic aldehyde, diacetyl (2,3-butanedione), vanillin, thymol, menthol, camphor, geraniol, carvone, δ-heptalactone, δ-nonalactone, δ-decalactone, δ-dodecalactone, γ-decalactone, γ-dodecalactone and quinoline.

A subject of the present invention is also a method of encapsulation comprising
  the dissolution of a maltodextrin and/or a glucose syrup obtained, by acid or enzymatic hydrolysis, from a leguminous starch having an amylose content comprised between 25% and 50%, expressed as dry weight relative to the dry weight of starch, in an aqueous solvent containing an emulsifier agent,
  the addition of a solution of the hydrophobic organic compound to be encapsulated in an organic solvent,
  the emulsification of the mixture obtained by application of shearing forces, and
  the drying of the emulsion obtained.

The drying of the emulsion can be carried out according to any appropriate technique. There can be mentioned for example spray-drying and fluidized bed spraying.

In another method according to the invention, the encapsulation agent is used not in a water dissolved state, but in the solid state. In other words, the encapsulation agent is mixed with a small quantity of water, insufficient to dissolve it completely but sufficient to allow to obtain a paste. This paste is then mixed, by kneading and/or mixing, with the compound to be encapsulated, in a powder state or in a dissolved state in an appropriate solvent.

Such an encapsulation method comprises in particular
the kneading of a mixture containing
the hydrophobic organic compound to be encapsulated,
a maltodextrin and/or a dehydrated glucose syrup obtained, by acid or enzymatic hydrolysis, from a leguminous starch having an amylose content comprised between 25% and 50%, expressed as dry weight relative to the dry weight of starch, and
a quantity of water insufficient to completely dissolve said maltodextrin and/or said dehydrated glucose syrup, and the elimination of the water by drying.

The method described above can be implemented for example in an extruder.

The drying stage can be carried out for example in a drying oven or in a granulator.

The use of the encapsulation agent according to the invention allows to obtain encapsulation yields greater than 70%, or greater than 80% and even greater than 90%.

BRIEF DESCRIPTION OF THE DRAWINGS

FIG. 1 shows a comparison of the evolution of the limonene oxidation as a function of the DE of the pea maltodextrins and/or glucose syrups.

The examples hereafter show that the pea maltodextrins and dehydrated glucose syrups allow to encapsulate hydrophobic compounds such as flavourings and/or active principles with a high yield, and to protect effectively the encapsulated substances against certain environmental factors. The effectiveness of this protection is equivalent to or greater than that observed for the maltodextrins and glucose syrups originating from other starches.

Example 1

Compositions were prepared comprising as encapsulation agents pea or maize maltodextrins or dehydrated glucose syrups, an emulsifier and, as a molecule to be encapsulated, limonene.

The maize and pea maltodextrins and dehydrated glucose syrups were obtained by enzymatic hydrolysis of the starch, following procedures known to a person skilled in the art.

The DE of the encapsulation agents was determined by means of the sugar reduction test described in the literature (*Food Chemicals Codex*, 4th edition, 1 Jul. 1996. Section 5, *General Tests and Assays, Appendix X: Carbohydrates* (*Starches, Sugars, and Related Substances*).

The maltodextrins (MD) and dehydrated glucose syrups (DGS) used are the following:
Maize maltodextrin of DE 17.4: Glucidex® 17
Maize maltodextrin of DE 12: Glucidex® 12
Pea maltodextrin of DE 7
Pea maltodextrin of DE 13.5
Pea maltodextrin of DE 17
Pea dehydrated glucose syrup of DE 21.5

The emulsifier used is a fluidized starch, more particularly a "waxy" maize starch modified by the grafting of octenyl succinate groups. This emulsifier is marketed by the Applicant under the name CLEARGUM® CO01.

TABLE 1

| encapsulation composition | | |
|---|---|---|
| | Quantity in % | Quantity by weight (g) for 40% of dry matter |
| MD | 21 | 105 g |
| Emulsifier | 15 | 75 g |
| Limonene | 4 | 20 g |
| Demineralised water | 60 | 300 g |

The encapsulation protocol is the following: A pre-emulsion is obtained by dissolution of the maltodextrin and/or glucose syrup and the emulsifier under slow stirring in demineralized water at 70° C. for 10 minutes. In parallel, a solution containing the molecule to be encapsulated is prepared, preheated to 30° C., then added to the pre-emulsion and vigorous stirring is maintained for 10 minutes.

The pre-emulsion is subjected for 10 minutes and at a temperature of 5° C. (immersion in a water bath) to significant shearing at a speed of 24,000 rpm in a POLYTRON PT 45/2M device.

The spray-drying (Lab Plant spray-drier SD05) is carried out on the emulsion preheated to 60° C. with an input temperature at 175° C., and by the use of a 1 mm diameter injection nozzle in allowing a pressure of the order of 2 bars inside.

In order to measure the encapsulation rate, a measurement of the retention of the limonene is carried out. The study is carried out in a standard way as described in the literature (Inglett G. E., Gelbman P., and Gary A. Reineccius (1988) "Encapsulation of Orange Oil: Use of Oligosaccharides from α-Amylase Modified Starches of Maize, Rice, Cassava, and Potato." In "Flavor Encapsulation," eds. Sara J. Risch and Gary A. Reineccius, chap. 4, pp: 29-36). The retention rate reflects the quantity of limonene which has been encapsulated during the spray-drying.

The fraction of non-encapsulated limonene corresponds to the limonene on the surface of the particles obtained after spray-drying and to the limonene evaporated during the spray-drying.

After spray-drying, the powder obtained is washed with a non-aqueous solvent such as hexane in order to recover the portion of limonene on surface of the particles.

The spray-dried powder is then solubilized, in order this time to recover the encapsulated limonene.

For each portion, the limonene and limonene oxide are solubilized in acetone then purified and assayed by gas chromatography (VARIAN 8200 CX autosampler chromatograph) starting with a DB1 column (Length 30 m, internal diameter. 0.32 mm, thickness of the film 1 μm). The chromatography is carried out under a temperature gradient of 60 to 250° C. at a rate of 7° C./minute. The carrier gas is helium at a pressure of 10 psi (68947.5728 Pa). The calibration is carried out with an inner standard stock solution of acetone at 0.15 g/l of 4-methyl-2-pentanone (MIBC). The stock solutions are solutions of acetone at 2 g/l of limonene and at 1 g/l of limonene oxide.

The quantity of limonene evaporated during the spray-drying is deduced from the total quantity of limonene, the limonene on the surface of the particles and the encapsulated limonene.

The retention rate of the limonene corresponds to the ratio of the encapsulated limonene to the non-encapsulated limonene.

TABLE 2

Retention rate of the limonene

| Support | | Limonene (%) |
|---|---|---|
| Maize MD | DE 12 | 67 |
| | DE 17 | 67 |
| Pea MD | DE 7 | 74 |
| | DE 13 | 63 |
| | DE 17 | 63 |
| Pea DGS | DE 21.5 | 74 |

The retention rates of limonene observed for the pea maltodextrins are comparable to those obtained with the maize maltodextrins (see Table 2). Thus, the pea maltodextrins allow a coating of the substrate at a rate comparable to that observed for the maize maltodextrins. This encapsulation rate is even better for the pea maltodextrins of DE 7. Indeed, in the latter case, the retention rate of the limonene is significantly greater than the retention rate observed for the maize maltodextrins. It is moreover noted, that the retention rate is also significant in the case of pea dehydrated glucose syrup of DE 21.5.

Example 2

A composition identical to Example 1 is used for an encapsulation of limonene by spray-drying. In order to determine the quality of the limonene encapsulation, or the encapsulating power of the pea or maize maltodextrins (MD) and/or dehydrated glucose syrups (DGS), i.e. the protective power against the external environment aggressions, a measurement of the limonene oxidation as a function of time is carried out (see FIG. 1 and Table 3). The encapsulated limonene is incubated at a temperature of 70° C. in a drying oven for 20, 40 and 60 days. The limonene and the limonene oxide are solubilized in acetone then purified and assayed by gas chromatography (VARIAN 8200 CX autosampler chromatograph) according to the conditions set out in Example 1.

TABLE 3

| | % limonene oxide/100% limonene | | | |
|---|---|---|---|---|
| Support | t0 | t20 | t40 | t60 |
| Maize MD 12 | 0 | 1.79 | 1.79 | 1.80 |
| Maize MD 17 | 0 | 1.79 | 1.94 | 1.98 |
| Pea MD 7 | 0 | 1.22 | 1.35 | 1.78 |
| Pea MD 13 | 0 | 1.90 | 1.90 | 1.90 |
| Pea MD 17 | 0 | 1.90 | 2.22 | 2.41 |
| Pea DGS 21.5 | 0 | 2.43 | 2.43 | 2.50 |

Measurement of the limonene oxidation rate reflects a comparable quality of encapsulation between the maize and pea maltodextrins and/or glucose syrups vis-à-vis the limonene oxidation, i.e. a comparable encapsulating power.

In order to determine the type of encapsulation observed during the use of pea maltodextrins and/or glucose syrups as encapsulation supports, a comparison of the evolution of the limonene oxidation as a function of the DE of the pea maltodextrins and/or glucose syrups is carried out (FIG. 1).

It is conventionally described in the literature that during the use of maize or potato maltodextrins and glucose syrups as encapsulation supports, an increase in the limonene oxidation is observed when the DE of the maltodextrins and glucose syrups decrease (Reineccius G. A. (1988) "Spray drying of Food Flavors" In "Flavor Encapsulation," eds. Sara J. Risch and Gary A. Reineccius, chap. 7, pp: 55-66). Thus, the encapsulation quality with maize or potato maltodextrins and glucose syrups increases when their DE increases.

In the case of pea maltodextrins and glucose syrups the reverse phenomenon is observed (see FIG. 1). Indeed, during encapsulation by spray-drying with pea maltodextrins or glucose syrups as encapsulation agents, the limonene oxidation decreases when the DE of the maltodextrins and/or glucose syrups decrease. In other words, the encapsulating power increases when the DE of the pea maltodextrins and/or glucose syrups decreases. Moreover, pea maltodextrins allow a better protection of the encapsulated substrate against the external environment than those obtained with pea dehydrated glucose syrups.

Thus, the phenomena observed during encapsulation with maize (or potato) maltodextrins and/or glucose syrups and those observed during encapsulation with pea maltodextrins and/or glucose syrups do not follow the same principles.

Example 3

An encapsulation composition is prepared in order to carry out the menthol encapsulation with pea or maize maltodextrins or with a β-cyclodextrin by an encapsulation technique used only for the cyclodextrins. The encapsulation is carried out by kneading, i.e. by mixing in a double envelope kneader, a composition comprising 68% encapsulating agent (maltodextrin or cyclodextrin), 22.7% water and 9.3% menthol.

The flavouring is progressively added to the encapsulating agent. The mixture is mixed for 5 to 10 minutes then undergoes a drying phase at 70° C. The dried composition comprises 88% pea or maize maltodextrins or β-cyclodextrins and 12% menthol.

A differential calorimetric analysis (ACD or DSC; METTLER DSC 30 device) is carried out in order to measure the level of complexation between the maltodextrins or the β-cyclodextrins and the menthol.

During this study, the mixture is subjected to a reheating phase during which it undergoes a change of state. The glass transition temperature (Tg) is thus determined as is the amplitude of the signal (ΔCp) which is directly proportional to the level of complexation between the encapsulating agent and the menthol.

The protocol followed during this study is the following. The sample is maintained at −20° C. for 2 minutes then it undergoes a change of temperature from −20 to 180° C. at a rate of 10° C./minute.

The level of encapsulation obtained for the β-cyclodextrins is 100% (result not shown). This percentage is conventionally obtained for encapsulation by the kneading of menthol with β-cyclodextrins.

TABLE 4

| | DSC | | Level of |
|---|---|---|---|
| Support | Tg (° C.) | ΔCp (j/g/° C.) | complexes (%) |
| Pea MD DE7 | 83.4 | 0.035 | 100 |
| | 103.7 | 0.1 | |
| Pea MD DE 13.5 | 96.65 | 0.065 | 93.90 |
| Pea MD DE17 | 82.5 | 0.05 | 100 |
| | 105.3 | 0.12 | |
| Maize MD DE 12 | 105.4 | 0.1 | 55.20 |
| Maize MD DE 17 | 107.4 | 0.11 | 64.40 |

When the level of complexation measured is 100%, a new analysis is carried out in order to confirm the measurement.

This analysis shows a pea maltodextrin/menthol complexation rate of the order of 94 to 100% whereas the rate observed for the maize maltodextrin/menthol complexes is much lower, from 55 to 64%.

The invention claimed is:

1. A method of encapsulation of a hydrophobic organic compound, comprising the following steps:
dissolving a maltodextrin obtained by acid or enzymatic hydrolysis, from a leguminous starch having an amylose content comprised between 30% and 40%, expressed as dry weight relative to the dry weight of starch, in an aqueous solvent containing an emulsifying agent, said dissolving forming an aqueous solution consisting of said aqueous solvent, said maltodextrin, and said emulsifying agent;
adding to said aqueous solution a solution of the hydrophobic organic compound in an organic solvent, thereby obtaining a mixture consisting of said aqueous solvent, said maltodextrin, said emulsifying agent and said solution of said hydrophobic compound and said organic solvent;
emulsifying said mixture obtained by application of shearing forces, thereby obtaining an emulsion consisting of said aqueous solvent, said maltodextrin, said emulsifying agent and said solution of said hydrophobic compound and said organic solvent; and
drying the emulsion obtained to produce encapsulation of said hydrophobic organic compound by said maltodextrin,
wherein said leguminous starch is pea starch, and
wherein said maltodextrin has a dextrose equivalent comprised between 3 and 7 to increase protection of the hydrophobic organic compound against oxidation.

2. The method according to claim 1, wherein the hydrophobic organic compound to be encapsulated is selected from the group consisting of flavourings, colouring agents, liposoluble vitamins, odoriferous molecules, intense sweeteners, and fats.

3. The method according to claim 1, wherein the hydrophobic organic compound to be encapsulated is selected from the group consisting of fatty acids, monoglycerides, decanal, octanal, hexanal, butanol, menthone, fenchone, limonene, naphthol, spice oleoresins, alliaceous flavours essential oils, benzoic aldehyde, diacetyl (2,3-butanedione), vanillin, thymol, menthol, camphor, geraniol, carvone, δ-heptalactone, δ-nonalactone, δ-decalactone, δ-dodecalactone, γ-decalactone, γ-dodecalactone and quinoline.

4. The method according to claim 1, wherein drying of the emulsion obtained is performed by spray-drying.

5. A method of encapsulation of a hydrophobic organic compound with a composition consisting of a maltodextrin and/or a dehydrated glucose syrup, comprising the following steps:
kneading a mixture containing the hydrophobic organic compound to be encapsulated, said composition consisting of a maltodextrin and/or a dehydrated glucose syrup obtained, by acid or enzymatic hydrolysis, from a leguminous starch having an amylose content comprised between 25% and 50%, expressed as dry weight relative to the dry weight of starch, and a quantity of water insufficient to completely dissolve said composition consisting of said maltodextrin and/or said dehydrated glucose syrup; and
eliminating the water by drying,
wherein said leguminous starch is pea starch,
and wherein hydrophobic organic compound is encapsulated by said composition consisting of said maltodextrin and/or dehydrated glucose syrup.

6. The method according to claim 5, wherein the leguminous starch has an amylose content comprised between 30% and 40%, expressed as dry weight relative to the dry weight of starch.

7. The method according to claim 5, wherein the leguminous starch has an amylose content comprised between 35 and 38%, expressed as dry weight relative to the dry weight of starch.

8. The method according to claim 5, wherein the glucose syrup has a dextrose equivalent (DE) of less than 30.

9. The method according to claim 5, wherein the maltodextrin has a dextrose equivalent (DE) of less than 18.

10. The method according to claim 5, wherein the maltodextrin has a dextrose equivalent (DE) comprised between 3 and 7.

11. The method according to claim 5, wherein the hydrophobic organic compound to be encapsulated is selected from the group consisting of fatty acids, monoglycerides, decanal, octanal, hexanal, butanol, menthone, fenchone, limonene, naphthol, spice oleoresins, alliaceous flavours essential oils, benzoic aldehyde, diacetyl (2,3-butanedione), vanillin, thymol, menthol, camphor, geraniol, carvone, δ-heptalactone, δ-nonalactone, δ-decalactone, δ-dodecalactone, γ-decalactone, γ-dodecalactone and quinoline.

* * * * *